United States Patent
Kairali et al.

(10) Patent No.: US 12,107,746 B2
(45) Date of Patent: Oct. 1, 2024

(54) ENHANCING SOFTWARE APPLICATION HOSTING IN A CLOUD ENVIRONMENT

(71) Applicant: International Business Machines Corporation, Armonk, NY (US)

(72) Inventors: Sudheesh S Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/310,972

(22) Filed: May 2, 2023

(65) Prior Publication Data

US 2023/0318954 A1    Oct. 5, 2023

Related U.S. Application Data

(63) Continuation of application No. 17/648,530, filed on Jan. 20, 2022, now Pat. No. 11,729,081.

(51) Int. Cl.
  *H04L 43/0852*  (2022.01)

(52) U.S. Cl.
  CPC .............. *H04L 43/0852* (2013.01)

(58) Field of Classification Search
  CPC ................................. H04L 43/0852
  USPC ....................................... 709/224
  See application file for complete search history.

(56) References Cited

U.S. PATENT DOCUMENTS

| 7,493,394 B2 | 2/2009 | Zavalkovsky |
| 8,468,196 B1 | 6/2013 | Roskind |
| 8,966,487 B1 | 2/2015 | Leonard |
| 9,760,854 B1 | 9/2017 | Chowdhary |

(Continued)

FOREIGN PATENT DOCUMENTS

| CN | 113824590 A | * | 12/2021 | |
| CN | 114520773 A | * | 5/2022 | |
| WO | WO-2022002357 A1 | * | 1/2022 | ......... H04L 41/0622 |

OTHER PUBLICATIONS

Kairali et al., "Enhancing Software Application Hosting in a Cloud Environment," U.S. Appl. No. 17/648,530, filed Jan. 20, 2022.

(Continued)

*Primary Examiner* — Melvin H Pollack
(74) *Attorney, Agent, or Firm* — Joseph P. Curcuru (57) ABSTRACT

In an approach to optimize server connection timeout errors in a cloud environment, embodiments create a knowledge corpus associated with connection timeout patterns based on historical learning of transaction parameters and predicts a criticality of a transaction based on one or more identified contextual situations. Further, embodiments dynamically adjust a connection timeout range of the transaction based on the predicted criticality and one or more identified contextual situations of the transaction, and selectively identify a connection timeout range for the transaction based on an evaluation of the one or more contextual situations. Additionally, embodiments analyze generated timeout errors on a remote server from within a service mesh, and adjust timeout values of the transaction based on the analyzed generated timeouts errors. Responsive to the transaction receiving a timeout error, embodiments output a recommended timeline detailing when the transaction can be reinitiated.

20 Claims, 6 Drawing Sheets

(56) References Cited

U.S. PATENT DOCUMENTS

| | | | |
|---|---|---|---|
| 9,799,017 B1 | 10/2017 | Vermeulen | |
| 10,423,638 B2 | 9/2019 | Taropa | |
| 10,592,322 B1 | 3/2020 | Seshadri | |
| 10,644,962 B2 | 5/2020 | O'Neill | |
| 10,691,576 B1 | 6/2020 | Shapira | |
| 10,924,556 B2 | 2/2021 | Dierckens | |
| 10,956,248 B1 | 3/2021 | Volpe | |
| 11,050,639 B2 | 6/2021 | Lau | |
| 11,050,645 B2* | 6/2021 | Flinta | G06F 11/3495 |
| 11,153,152 B2* | 10/2021 | Siddiqi | H04L 41/22 |
| 11,165,634 B2* | 11/2021 | Medam | G06F 11/2094 |
| 11,288,025 B2* | 3/2022 | Martin | G06F 3/1267 |
| 11,296,949 B2* | 4/2022 | Gupta | H04L 43/0811 |
| 11,301,617 B2* | 4/2022 | Schmiedehausen | G06F 9/5072 |
| 11,336,698 B1 | 5/2022 | Wu | |
| 11,394,801 B2* | 7/2022 | Raman | H04L 67/01 |
| 11,418,395 B2* | 8/2022 | Gati | H04L 41/046 |
| 11,418,550 B1 | 8/2022 | Eberlein | |
| 11,431,582 B2* | 8/2022 | May | G06N 5/04 |
| 11,461,223 B2* | 10/2022 | Moondhra | G06F 11/3692 |
| 11,474,840 B1* | 10/2022 | Momchilov | G06F 16/958 |
| 11,475,374 B2* | 10/2022 | Polleri | G06F 16/285 |
| 11,526,493 B2* | 12/2022 | Borrill | G06F 16/2379 |
| 11,531,554 B2* | 12/2022 | Borra | G06F 9/44505 |
| 11,540,345 B2* | 12/2022 | Paczkowski | H04W 4/70 |
| 11,614,893 B2* | 3/2023 | Kannan | G06F 3/0659 711/167 |
| 11,637,737 B2* | 4/2023 | Corley | H04L 43/10 709/220 |
| 11,637,748 B2* | 4/2023 | Myers | G06F 9/505 709/221 |
| 11,669,439 B2* | 6/2023 | Moondhra | H04L 9/0637 717/124 |
| 11,682,013 B2* | 6/2023 | Salla | G06Q 20/027 705/44 |
| 11,689,943 B2* | 6/2023 | Patil | H04W 76/19 370/252 |
| 11,765,045 B1* | 9/2023 | Nguyen | H04L 43/0811 709/224 |
| 2014/0173739 A1 | 6/2014 | Ahuja | |
| 2017/0289236 A1 | 10/2017 | Merchant | |
| 2017/0302554 A1 | 10/2017 | Chandrasekaran | |
| 2018/0123921 A1 | 5/2018 | O'Connell | |
| 2018/0270295 A1 | 9/2018 | Seed | |
| 2018/0270331 A1 | 9/2018 | Wason | |
| 2018/0276251 A1 | 9/2018 | Srinivasan | |
| 2019/0058709 A1 | 2/2019 | Kempf | |
| 2019/0132377 A1 | 5/2019 | Hulick, Jr. | |
| 2019/0205533 A1 | 7/2019 | Diehl | |
| 2020/0034797 A1 | 1/2020 | Jonnalagadda | |
| 2020/0034833 A1 | 1/2020 | Collen | |
| 2020/0162890 A1 | 5/2020 | Spencer | |
| 2020/0175001 A1 | 6/2020 | Malan | |
| 2020/0201913 A1 | 6/2020 | Terry | |
| 2020/0394648 A1 | 12/2020 | Blackshear | |
| 2021/0126836 A1* | 4/2021 | Patel | H04L 43/0852 |
| 2021/0184942 A1* | 6/2021 | Tootaghaj | H04L 41/16 |
| 2021/0192412 A1 | 6/2021 | Krishnaswamy | |
| 2021/0263779 A1* | 8/2021 | Haghighat | G06F 21/78 |
| 2021/0304026 A1 | 9/2021 | Mermoud | |
| 2021/0306334 A1 | 9/2021 | Han | |
| 2021/0326192 A1* | 10/2021 | Parkinson | H04L 67/02 |
| 2021/0398080 A1 | 12/2021 | Asanuma | |
| 2022/0027379 A1 | 1/2022 | Unterbrunner | |
| 2022/0082616 A1* | 3/2022 | Doshi | G06F 11/1438 |
| 2022/0141115 A1* | 5/2022 | Kawano | H04L 43/04 709/224 |
| 2022/0171648 A1 | 6/2022 | Rodriguez | |
| 2022/0171787 A1 | 6/2022 | Chen | |
| 2022/0222047 A1* | 7/2022 | Todirel | G06F 11/1471 |
| 2022/0303331 A1 | 9/2022 | Svennebring | |
| 2022/0345490 A1 | 10/2022 | Wu | |
| 2022/0382617 A1* | 12/2022 | Tiwari | G06F 11/0751 |
| 2022/0391420 A1* | 12/2022 | Quatro | G06F 16/2282 |
| 2023/0086473 A1* | 3/2023 | Deliwala | H04L 47/762 709/226 |

OTHER PUBLICATIONS

"Best practices for monitoring cloud applications", Microsoft, Jul. 16, 2016, 31 pages, <https://docs.microsoft.com/en-us/azure/architecture/best-practices/monitoring>.

"Istio / Time Management", accessed on Sep. 30, 2021, 1 page, <https://istio.io/latest/docs/concepts/traffic-management/#timeouts>.

Mell, et al., "The NIST Definition of Cloud Computing", National Institute of Standards and Technology, Special Publication 800-145, Sep. 2011, 7 pages.

Stone, Dan, "What Does a Server Connection Time Out Mean?", accessed on Sep. 30, 2021, 4 pages, < https://smallbusiness.chron.com/server-connection-timeout-mean-71381>.

Zhu et al., "Intelligent timeout master: Dynamic timeout for SDN-based data centers", 2015 IFIP, 4 pages, <https://ieeexplore.ieee.org/document/7140363>.

List of IBM Patents or Patent Applications Treated as Related, filed herewith, 2 pages.

* cited by examiner

ENHANCING SOFTWARE APPLICATION HOSTING IN A CLOUD ENVIRONMENT

BACKGROUND OF THE INVENTION

The present invention relates generally to the field of computer system resources in cloud environments, and more particularly to server connection errors for applications hosted in cloud environments.

Cloud computing is the on-demand availability of computer system resources, especially data storage (cloud storage) and computing power, without direct active management by the user. Large cloud systems often have functions distributed over multiple locations, each location being a data center. Cloud computing relies on sharing of resources to achieve coherence and economies of scale, typically using a "pay-as-you-go" model which can help in reducing capital expenses but may also lead to unexpected operating expenses for unaware users. Users may submit connection requests to an application from a server/cloud environment, which may result in a server connection timeout if an error occurs. A server connection timeout means that a server is taking too long to reply to a data request made from another device. Timeout errors (timeouts) are not a reply message; however, they are displayed when there isn't a reply and a server request is not fulfilled within a predetermined length of time. A server connection timeout error does little to no describing of what went wrong or why the error occurred. Timeout errors simply identifies that an error has occurred. A server connection timeout is meant to prevent devices from waiting ceaselessly for the server to respond. Timeout errors can occur for a number of reasons such as a server issue, outdated browser and cache, blacklisted sites, sporadic internet connection, faulty extensions, the requesting device, the network hardware and/or the internet connection can be at fault.

SUMMARY

Embodiments of the present invention disclose a computer-implemented method, a computer program product, and a system for optimizing server connection timeout errors in a cloud environment, the computer-implemented method comprising: creating a knowledge corpus associated with connection timeout patterns based on historical learning of transaction parameters; predicting a criticality of a transaction based on one or more identified contextual situations; dynamically adjusting a connection timeout range of the transaction based on the predicted criticality and one or more identified contextual situations of the transaction; selectively identifying a connection timeout range for the transaction based on an evaluation of the one or more contextual situations; analyzing generated timeout errors on a remote server from within a service mesh; adjusting timeout values of the transaction based on the analyzed generated timeouts errors; and responsive to the transaction receiving a timeout error, outputting a recommended timeline detailing when the transaction can be reinitiated.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that the connection timeout is fixed between microservices or with database applications (e.g., communication occurs between a client application to a database server, or a microservice to a microservice). Further, embodiments of the present invention recognize that while connectivity enables the access of data or push data, if the connectivity is not successful for a defined timeframe, then connection timeout error will generate. Additionally, embodiments of the present invention recognize that a server connection timeout error does little to describe what is causing the error or explain why the error is occurring. Embodiments of the present invention recognize that the art needs a server connection timeout error (i.e., notification) that identifies and describes the context of an error of an activity. Embodiments of the present invention improve the art and solve the particular issues stated above by (i) creating a knowledge corpus, based on a connection timeout pattern of connection requests, through historical learning of connection timeout patterns (e.g., considering the health of microservices, number of concurrent load, server parameters, health of requesting device, network hardware, internet connection, and/or any other connection timeout pattern elements known and used in the art), (ii) predicting the criticality of a request (e.g. rescue operation is being performed, so the robots are connecting to remote cloud server) based on an identified contextual situation (e.g. geolocation location of the request, and type of request) and dynamically increasing the connection timeout range for the request, so the connectivity can be established for the request; (iii) evaluating the contextual situation of each of the requests and selectively identifying connection timeout ranges for each of the request while connecting to the remote server; (iv) analyzing the recent timeouts on a remote server from within a service mesh and adjusting the timeout values/ranges accordingly; (v) selectively identifying which connection requests are approaching a connection timeout (i.e., within a predetermined range prior to executing a connection timeout); and (vi) evaluating the criticality of each of the connection requests based on the historical learning.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (application processing) system can be a single device or a collection of distributed devices that are adapted to execute one or more embodiments of the methods of the present invention. For instance, a system can be a personal computer (PC), a server or a collection of PCs and/or servers connected via a network such as a local area network, the Internet and so on to cooperatively execute at least one embodiment of the methods of the present invention.

Implementation of embodiments of the invention may take a variety of forms, and exemplary implementation details are discussed subsequently with reference to the Figures (i.e., FIG. 1-FIG. 6).

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Illustrative embodiments can be utilized in many different types of application processing environments. Illustrative embodiments can, for example, be employed in relation to stateless and scalable cloud-based applications for data and/or event processing.

Figure 1:
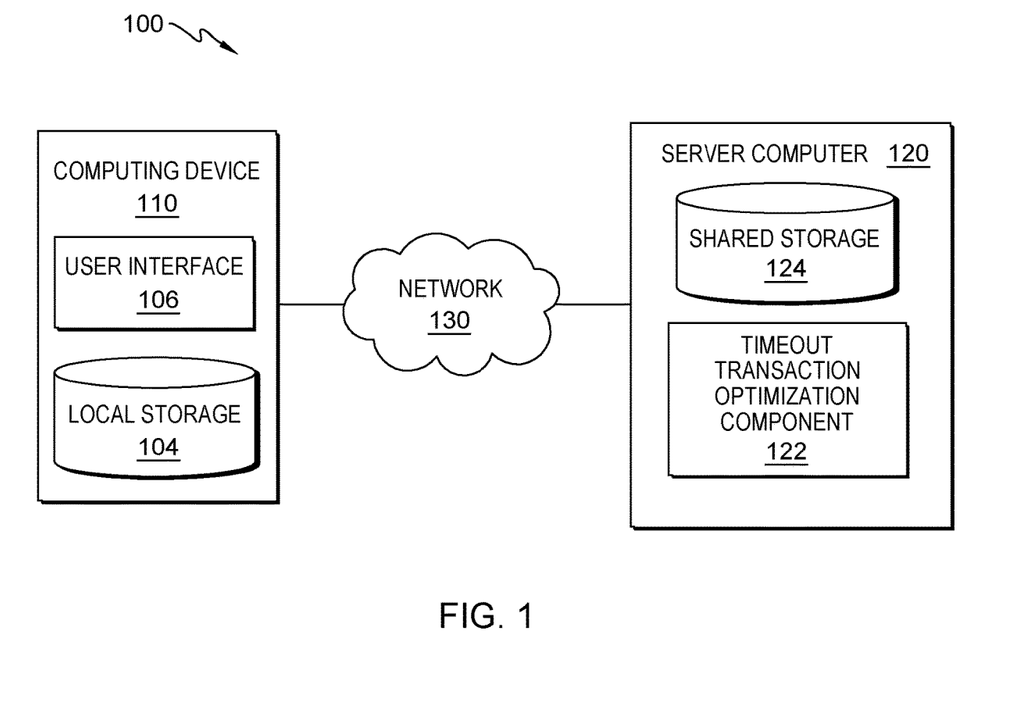
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 4.

User interface (interface) 106 provides an interface to timeout transaction optimization component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 4. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1, in addition to shared storage 124, server computer comprises a primary and a secondary database, described below in FIG. 4. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

In various embodiments, component 122 creates a knowledge corpus (knowledge corpus 126) associated with a connection timeout pattern of one or more connection requests (requests) based on historical learning of previous connection request and connection request errors (i.e., timeouts) by considering the health of microservices, number of concurrent load, server parameters, health of requesting device, network hardware, and/or internet connection, wherein if component 122 predicts that a connection request (request) is going to face a connection timeout error after a predefined timeframe then component 122 may immediately stop the connection without notifying the user to wait for a fixed (i.e., predetermined) duration of time. In various embodiments, in a service mesh architecture (service mesh) knowledge corpus 126 is in the control plane of service mesh. In various embodiments, based on an identified contextual situation (e.g. geolocation location of the request, and/or type of request), component 122 predicts the criticality of the request (e.g. rescue operation is being performed, so the robots are connecting to remote cloud server) and accordingly component 122 dynamically increases the connection timeout range for the request, so that connectivity can be established for the request.

Component 122 may evaluate the contextual situation of one or more requests and selectively identify a connection timeout range for the one or more requests while connecting to server computer 120 (remote server). Further, component 122 may analyze the recently generated timeouts on a remote server from within a service mesh and adjust the timeout values based on the analyzed recently generated timeouts, wherein the recently generated timeouts are timeout errors generated within a predetermined range before the current connection request. In various embodiments, if any ongoing connection is to be aborted with a connection timeout, then component 122 evaluates the degree of completeness of the activity (like e.g., 20% of the activity is pending versus 90% is of the activity is pending), and component 122 selectively identifies which connection is going be aborted with a connection timeout. Activity is any transaction processed by a microservice chain in the service mesh context. A Service mesh will collect degree of completeness of each transaction by identifying which microservice the transaction is occurring within a chain of microservice (e.g., microservice 1 (M1)→microservice 1 (M2)→microservice 3 (M3)→microservice 4 (M4)). In one example, if one transaction is occurring at M1 and a second transaction is occurring at M3, then degree of completeness of second transaction will be identified as having a higher degree of completeness. Further, within a single microservice it could analyze the degree of completeness by retrieving and analyzing the transaction logs and comparing the previous logs of similar types of transactions. In various embodiments, based on historical learning, component 122 evaluates the criticality of each of the connection requests, wherein if one or more connection requests are identified to timeout then component 122 generates and outputs a recommended timeline detailing when the connection can be reinitiated.

Figure 2:
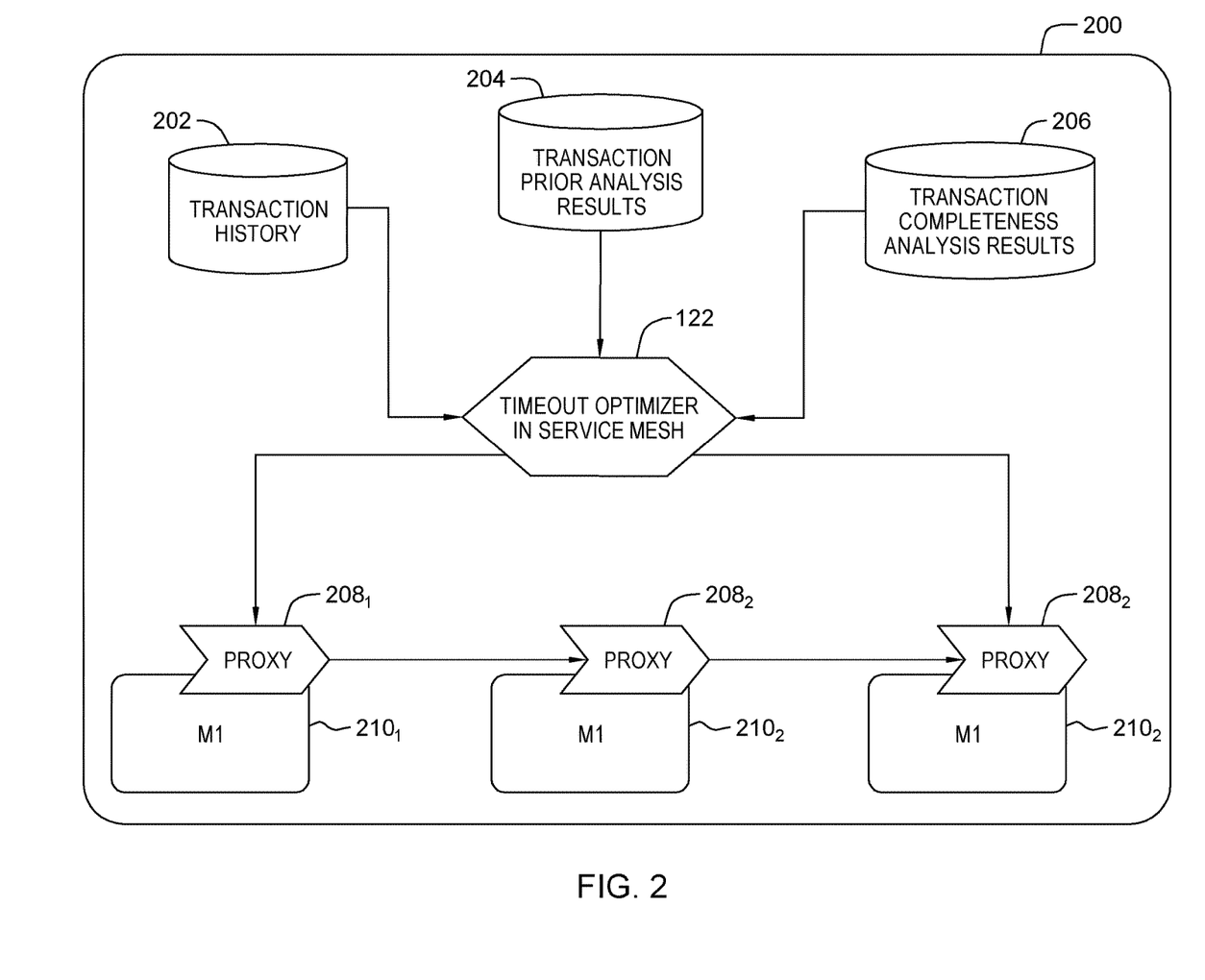
FIG. 2 is a functional block diagram illustrating a distributed data processing environment, for implementing optimized timeouts in a chain of microservices through timeout error extensions in a service mesh control plane in accordance with an embodiment of the present invention.

FIG. 2 is a functional block diagram illustrating a distributed data processing environment, generally designated 200, for implementing optimized timeouts in a chain of microservices through timeout error extensions in a service mesh control plane, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Component 122 may be implemented as an extension to service mesh architecture 200. However, in some embodiments, component 122 may be implemented as an independent system within computing environment 100. In various embodiments, component 122 executes within a service mesh control plane (i.e., service mesh architecture 200). In the depicted embodiment, service mesh architecture 200 comprises transaction history 202, transaction priority analysis results 204, transaction completeness analysis results 206, component 122, and proxy 208$_1$-proxy 208$_3$ and microservice 210$_1$-microservice 210$_3$ respectively. In various embodiments, not depicted in FIG. 2, service mesh architecture 200 comprises proxy 208$_1$-proxy 208$_N$, wherein N represents a positive integer, and accordingly the number of scenarios implemented in a given embodiment of the present invention is not limited to those depicted in FIG. 2. Similarly, in various embodiment, not depicted in FIG. 2 service mesh architecture 200 comprises microservice 210$_1$-microservice 210$_N$, wherein N represents a positive integer, and accordingly the number of scenarios implemented in a given embodiment of the present invention is not limited to those depicted in FIG. 2. Proxy 208$_1$-proxy 208$_3$ are a proxy server that provides a gateway between users and a network (e.g., the internet) and acts as an intermediary between a client requesting a resource and the server providing that resource.

In various embodiments, service mesh architecture 200 comprises current timeout related configurations of microservices known and understood in the art. In the depicted embodiment, transaction history 202 collects and stores the transaction history executed within or by service. mesh architecture 200. Transaction history 202 collects and stores the details of actually timed out transactions (i.e., executed timeout functions) and a degree of completeness of each transaction, wherein the degree of completeness is predetermined. In various embodiments, component 122, via transaction history 202, collect degree of completeness of each transaction by identifying the location of the transaction in a chain of microservices (i.e., identifying which microservice in a chain of microservices a transaction (e.g., timeout error) has occurred). For example, microservice 210$_1$→microservice 210$_2$→microservice 210$_3$, wherein if a first transaction is at microservice 210$_1$ and a second transaction is at microservice 210$_3$, then the degree of completeness for the second transaction will be higher. Component 122 may collect the degree of completeness of a transaction within a single microservice, wherein component 122 analyzes a degree of completeness by reviewing and analyzing transaction logs and comparing the current transaction logs with previous transaction logs of similar types of transactions, which is achieved using a Transaction ID. Alternatively, component 122 may collect the degree of completeness of a transaction from the microservice itself, wherein the microservice sends a degree of completeness illustrated by some progress bar implementation.

In various embodiments, component 122 may collect the criticality of a transaction. The criticality of a transaction and collection of the criticality of a transaction can either be through a user input or is can be determined based on the API call type or input data type. For example, for user input, if a rescue operation is being performed, then the robots are connecting to a remote cloud server, in such a case along with API call the criticality will be allowed. In another example, for an API call type, if an Authorization/Authentication (AUTH) call is executed then the AUTH call would be more critical than a read user call. In another example, for identifying and collecting criticality using data type, component 122 can define particular servers, directories, storage locations, or types thereof as indicators of the data's criticality, for instance, based on certain servers, directories, storage locations being identified as reserved for or generally serving as repositories for critical data, wherein component 122 analyzes the metadata of data and identifies whether it contains critical data.

In various embodiments, component 122, via transaction history, transaction priority analysis results and/or transaction completeness analysis results, identifies and implements timeout parameters based on historical analysis. For example, if a non-critical transaction is waiting on an external endpoint call and reviewing and/or analyzing the transaction history of transaction completed within the last ten minutes that have timed out and if component 122 identifies that the current transactions have not timed-out because of the microservice configuration, then component 122, via service mesh architecture 200, sets ten minutes as the timeout parameter to save the resources in service mesh architecture 200. A transaction that has not timed out after one min is holding the microservice resources (e.g., CPU, Memory, and/or any other microservice resource known in the art). However, in various embodiments, if service mesh architecture 200 identifies the transaction could have timed out in ten seconds, then component 122 releases the microservice resources comprised by the transaction that are instructed to hold for the remaining fifty seconds. Component 122 may execute preemptive timeouts on non-critical transactions. In various embodiments, if there are several timeouts to a particular endpoint from within service mesh architecture 200, then component 122, via service mesh architecture 200, decides to timeout transactions that comprise larger timeouts set. For example, all the Dallas region non-relational, distributed database service call is timing out for last 5 mins and component 122 identifies that a reasonably less critical transaction is waiting and the timeout configuration identified to wait 10 mins on the transaction and degree of completeness is just 20%, then component 122, via service mesh architecture 200, preemptively timeouts such transactions.

In various embodiments, component 122 adjusts timeout's of critical transactions. In various embodiments, if there are one more transactions that are waiting to be executed (i.e., in the queue) and approaching a timeout error, then component 122 could further optimize the timeout error by selecting the order in which the transactions are to be timed out based on the identified criticality of the one or more transactions. In some embodiments noncritical transactions are ejected first. In various embodiments, if the transaction queue is below a predetermined threshold, then component executes time extension for the critical transactions in the queue based on the criticality analysis, wherein component 122 implements the time extension if the possibility of the endpoint to respond to the transaction is higher. In various embodiments, there may be a plurality of transactions awaiting timeout errors and service mesh architecture 200, via component 122, may maintain a maximum threshold of transactions it can extend without being timed-out even after the transactions have qualified for a timeout error (i.e., exceeded the predetermined time to connect to the server). For example, component 122 keeps a maximum threshold of 10 timed out extended transactions. In this example, if a critical transaction (i.e., a transaction with high priority and/or completion percentage) is getting timed out, then component 122 determines whether the queue full (e.g., 10 extended transactions are already in queue). However, in this example, if the queue is not full then instead of timing out the critical transaction component 122 adds the critical transaction to the queue and extends the predetermined timeout range of the critical transaction. In various embodiments, if the transaction queue of component 122 is full, then component 122 times-outs a less critical or less complete transaction to make room in the queue.

Component 122 may adjust timeout errors based on degree of completeness. In various embodiments, if there are N transactions that needs to be timed out with the same criticality level then they could be timed out in the reverse order based on the of degree of completeness, wherein N represents a positive integer. Additionally, in various embodiments, if there N transactions in same degree of completeness and same degree of criticality without a configured timeout then component 122 moves the N transaction to the timeout majority of transactions have. For example, suppose there are 100 transactions in a system with the same criticality and same level/degree of completeness and 95 of the transactions have a timeout value (i.e., range) of two minutes and five transactions do not comprise timeout configurations specified. In this example, component 122 applies the two minute timeout value from the 95 transaction to the 5 transactions. In various embodiments, component may generate and display a responsive prompt to an administrator of the cloud environment to confirm and execute the timeout range optimization. In other embodiments, component 122 executes the timeout range optimization automatically.

Figure 3:
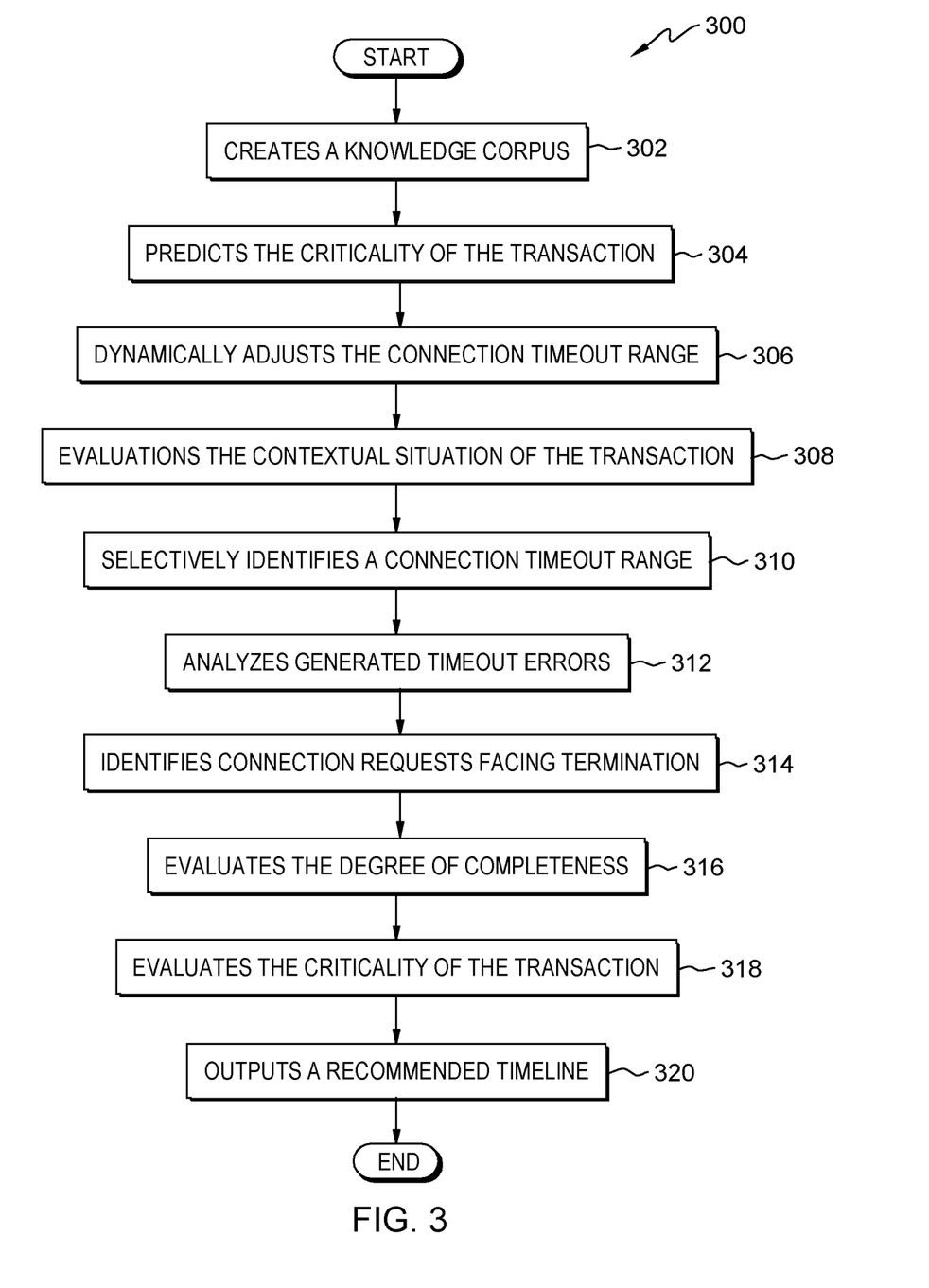
FIG. 3 illustrates operational steps of a timeout transaction optimizer component, on a server computer within the distributed data processing environment of FIG. 1, for optimizing server connection timeout errors in a cloud environment, in accordance with an embodiment of the present invention.

FIG. 3 illustrates operational steps of component 122, generally designated 300, in communication with server computer 120, within distributed data processing environment 100 of FIG. 1, for optimizing server connection timeout errors in a cloud environment, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 creates a knowledge corpus. In various embodiments component 122 creates a knowledge corpus associated with a connection timeout pattern of one or more requests based on historical learning (considering health of microservice, number of concurrent load, server parameters, health of requesting device, network hardware, and/or internet connection), and accordingly if component 122 predicts that a request is going to face a connection timeout error after a predefined timeframe then component 122 may immediately stop the connection without notifying the user to wait for a fixed duration of time.

In step 304, component 122 predicts the criticality of a transaction (e.g., request). In various embodiments, based on one or more identified contextual situations (e.g. geolocation location of the request, and/or type of request), component 122 predicts the criticality of the request (e.g. rescue operation is being performed, so the robots are connecting to remote cloud server).

In step 306, component 122, dynamically adjusts the connection timeout range. In various embodiments, component 122 adjusts the connection timeout range, wherein dynamically adjusting the connection timeout range comprises: either dynamically increasing the connection timeout range for the request, so that connectivity can be established to satisfy the request or dynamically decreasing the connection timeout range for the request, so that connectivity is not established.

In step 308, component 122 evaluates the contextual situation of the transaction (e.g., request). In various embodiments, component 122 may evaluate the contextual situation of one or more transactions.

In step 310, component 122 selectively identifies a connection timeout range for the transaction. In various embodiments, component 122 selectively identifies a connection timeout range for the one or more requests while connecting to server computer 120 (remote server).

In step 312, component 122 analyzes generated timeouts errors. In various embodiments, component 122 may analyze the recently generated timeouts on a remote server from within a service mesh and adjust the timeout values based on the analyzed recently generated timeouts, wherein the recently generated timeouts are timeout errors generated within a predetermined range before the current connection request.

In step 314, component 122 identifies connection request facing termination. In various embodiments, component 122 selectively identifies and/or flags ongoing connection requests (that are) reaching the predetermine threshold to trigger a timeout error (i.e., connection timeout is reaching termination).

In step 316, component 122 evaluates the degree of completeness of a transaction. In various embodiments, based on the identified connection requests facing termination, component 122 flags the connection request facing termination and evaluates the degree of completeness of the activity (e.g., 20% of the activity is pending versus 90% is of the activity is pending).

In step 318, component 122 evaluates the criticality of a transaction. In various embodiments, based on historical learning, component 122 evaluates the criticality of each of the connection requests.

In step 320, component outputs a recommended timeline. In various embodiments, component 122 generates and outputs a recommended timeline, detailing when the connection can be reinitiated, based on the one or more connection requests (i.e., transactions) being identified to experience a timeout error. In various embodiments, responsive to a transaction receiving a timeout error receiving a timeout error, component 122 generates and outputs a recommended timeline detailing when the connection can be reinitiated In various embodiments, the recommended timeline comprises information detailing where and why the transaction (i.e., request) has failed. In various embodiments, component 122 generates and outputs a recommended timeline detailing when the connection can be reinitiated based on the evaluated degree of completeness and criticality of the transactions.

Figure 4:
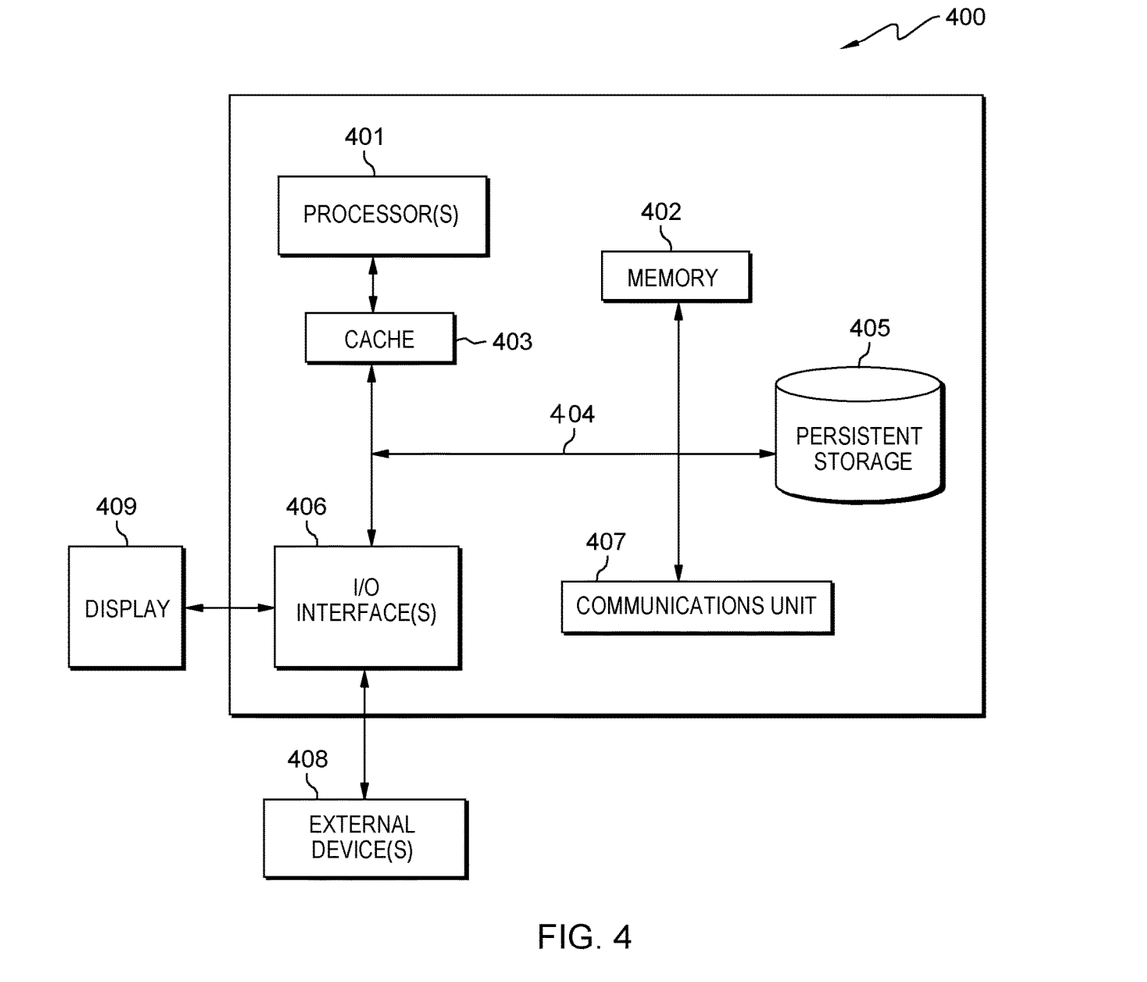
FIG. 4 depicts a block diagram of components of the server computer executing the calibration component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computing 120 represents an example of computer system 400 that includes component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
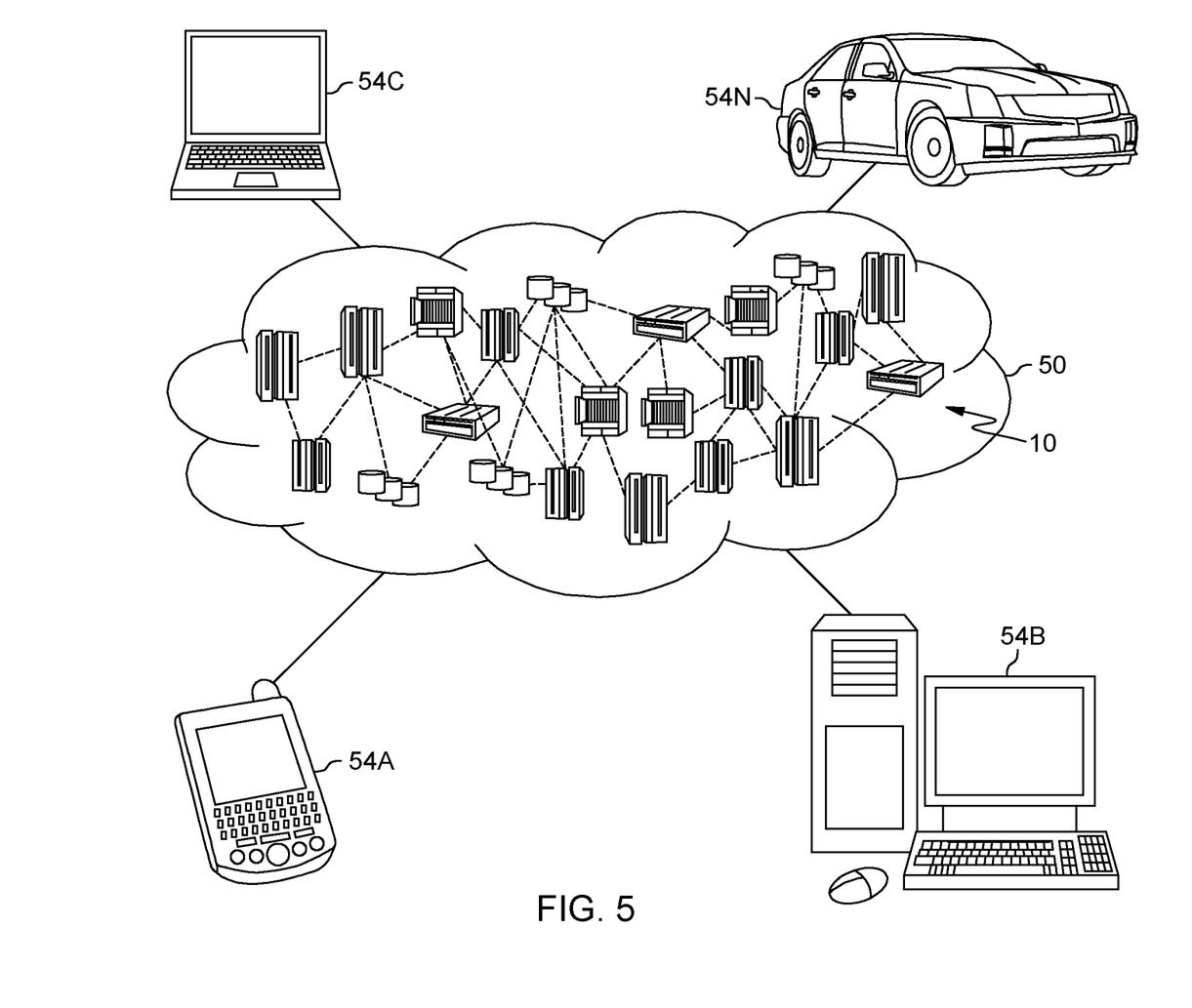
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
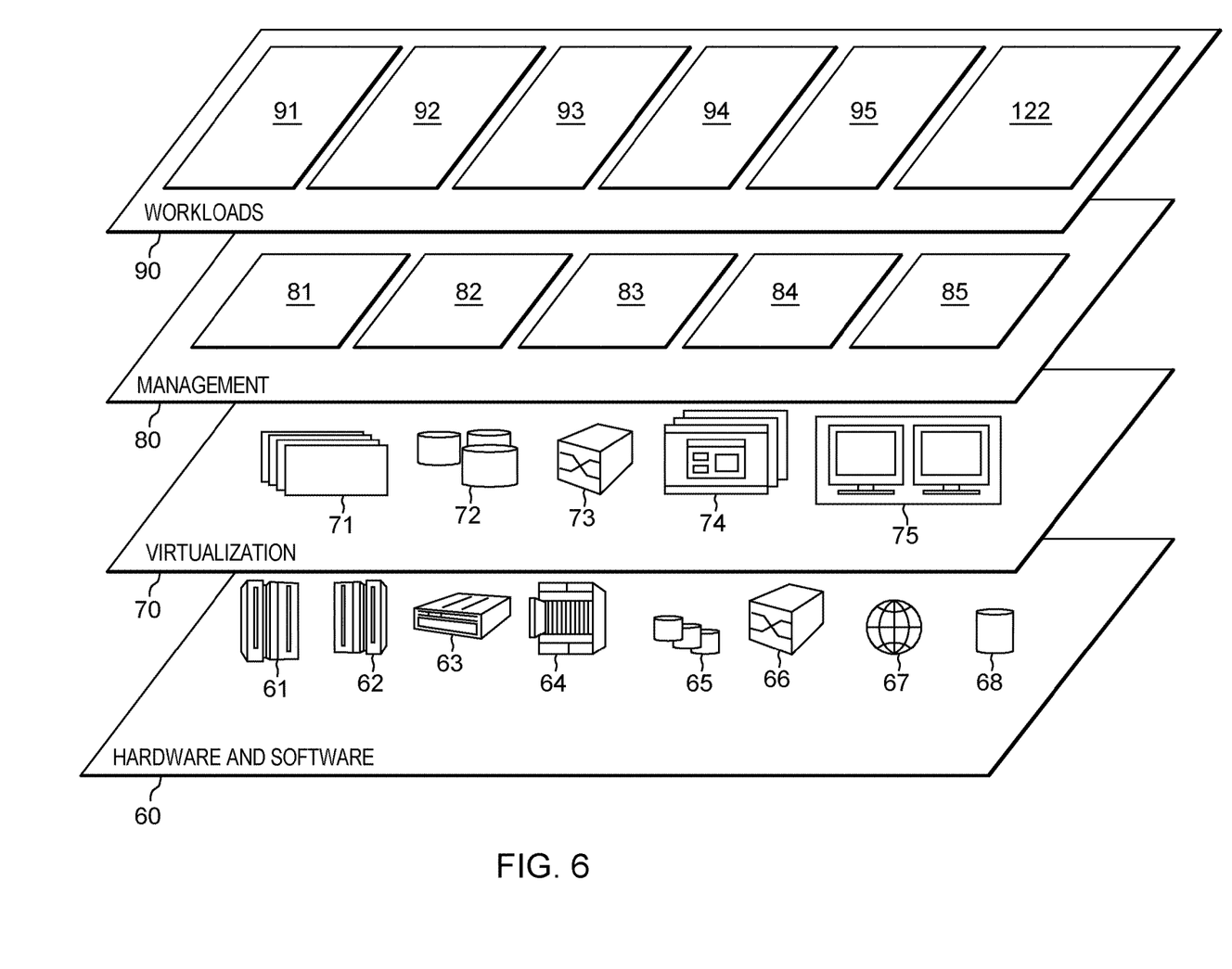
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Application processing 85 provides application processing according to proposed embodiments.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and timeout optimizer component (component) 122.

A proposed concept can enhance an event processing system by reducing costs per user while maximizing quality of service. Embodiments can also enable flexibility to provide higher qualities of service for particular users (e.g. user paying an additional fee). Such proposals can extend or improve the processing capabilities or efficiency of a iSaaS system or component.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimizing server connection timeout errors in a cloud environment, the computer-implemented method comprising:
    dynamically adjusting a connection timeout range of a transaction based on a predicted criticality and one or more identified contextual situations of the transaction;
    analyzing generated timeout errors on a remote server from within a service mesh, wherein the service mesh collects a degree of completeness for each transaction by identifying which microservice the transaction is occurring within a chain of microservices;
    adjusting timeout values of the transaction based on the analyzed generated timeouts errors;
    responsive to a transaction queue falling below a predetermined threshold, executing a time extension for one or more critical transactions in the queue based on the criticality analysis; and
    responsive to the transaction receiving a timeout error, outputting a recommended timeline detailing when the transaction can be reinitiated.

2. The computer-implemented method of claim 1, further comprising:
    identifying and selectively flagging the transaction is facing a connection timeout error by meeting or exceeding a predefined timeout error value;

terminating the transaction without causing a user to wait for a fixed duration of time; and
evaluating the contextual situation of the transaction.

3. The computer-implemented method of claim 1, further comprising:
creating a knowledge corpus associated with connection timeout patterns based on historical learning of transaction parameters;
predicting a criticality of a transaction based on one or more identified contextual situations; and
selectively identifying a connection timeout range for the transaction based on an evaluation of the one or more contextual situations.

4. The computer-implemented method of claim 1, further comprising:
evaluating a degree of completeness based on transaction facing termination; and
evaluating the criticality of the transaction based on the historical learning.

5. The computer-implemented method of claim 4, further comprising:
responsive to identifying that one or more connection requests has timeout, generating the recommended timeline detailing when the connection can be reinitiated based on the evaluated degree of completeness and criticality of the transactions.

6. The computer-implemented method of claim 1, further comprising:
identifying ongoing transactions facing termination.

7. The computer-implemented method of claim 1, wherein the recommended timeline comprises information detailing where and why the transaction has failed.

8. A computer system for optimizing server connection timeout errors in a cloud environment, the computer system comprising:
one or more computer processors;
one or more computer readable storage devices;
program instructions stored on the one or more computer readable storage devices for execution by at least one of the one or more computer processors, the stored program instructions comprising:
program instructions to dynamically adjust a connection timeout range of a transaction based on a predicted criticality and one or more identified contextual situations of the transaction;
program instructions to analyze generated timeout errors on a remote server from within a service mesh, wherein the service mesh collects a degree of completeness for each transaction by identifying which microservice the transaction is occurring within a chain of microservices;
program instructions to adjust timeout values of the transaction based on the analyzed generated timeouts errors;
responsive to a transaction queue falling below a predetermined threshold, program instructions to execute a time extension for one or more critical transactions in the queue based on the criticality analysis; and
responsive to the transaction receiving a timeout error, program instructions to output a recommended timeline detailing when the transaction can be reinitiated.

9. The computer system of claim 8, further comprising:
program instructions to identify the transaction is facing a connection timeout error by meeting or exceeding a predefined timeout error value; and
program instructions to terminate the transaction without causing a user to wait for a fixed duration of time;
program instructions to evaluate the contextual situation of the transaction.

10. The computer system of claim 8, further comprising:
program instructions to create a knowledge corpus associated with connection timeout patterns based on historical learning of transaction parameters;
program instructions to predict a criticality of a transaction based on one or more identified contextual situations; and
program instructions to selectively identify a connection timeout range for the transaction based on an evaluation of the one or more contextual situations.

11. The computer system of claim 8, further comprising:
program instructions to evaluate a degree of completeness based on transaction facing termination; and
program instructions to evaluate the criticality of the transaction based on the historical learning.

12. The computer system of claim 11, further comprising:
program instructions to generate the recommended timeline detailing when the connection can be reinitiated based on the evaluated degree of completeness and criticality of the transactions.

13. The computer system of claim 8, further comprising:
program instructions to identify ongoing transactions facing termination.

14. The computer system of claim 8, wherein the recommended timeline comprises information detailing where and why the transaction has failed.

15. A computer program product for optimizing server connection timeout errors in a cloud environment, the computer program product comprising:
one or more computer readable storage devices and program instructions stored on the one or more computer readable storage devices, the stored program instructions comprising:
program instructions to dynamically adjust a connection timeout range of a transaction based on a predicted criticality and one or more identified contextual situations of the transaction;
program instructions to analyze generated timeout errors on a remote server from within a service mesh, wherein the service mesh collects a degree of completeness for each transaction by identifying which microservice the transaction is occurring within a chain of microservices;
program instructions to adjust timeout values of the transaction based on the analyzed generated timeouts errors;
responsive to a transaction queue falling below a predetermined threshold, program instructions to execute a time extension for one or more critical transactions in the queue based on the criticality analysis; and
responsive to the transaction receiving a timeout error, program instructions to output a recommended timeline detailing when the transaction can be reinitiated.

16. The computer program product of claim 15, further comprising:
program instructions to identify the transaction is facing a connection timeout error by meeting or exceeding a predefined timeout error value;
program instructions to terminate the transaction without causing a user to wait for a fixed duration of time; and
program instructions to evaluate the contextual situation of the transaction.

17. The computer program product of claim 15, further comprising:
- program instructions to create a knowledge corpus associated with connection timeout patterns based on historical learning of transaction parameters;
- program instructions to predict a criticality of a transaction based on one or more identified contextual situations; and
- program instructions to selectively identify a connection timeout range for the transaction based on an evaluation of the one or more contextual situations.

18. The computer program product of claim 15, further comprising:
- program instructions to evaluate a degree of completeness based on transaction facing termination;
- program instructions to evaluate the criticality of the transaction based on the historical learning; and
- program instructions to generate the recommended timeline detailing when the connection can be reinitiated based on the evaluated degree of completeness and criticality of the transactions.

19. The computer program product of claim 15, further comprising:
- program instructions to identify ongoing transactions facing termination.

20. The computer program product of claim 15, wherein the recommended timeline comprises information detailing where and why the transaction has failed.

* * * * *